United States Patent
Shimada (10) Patent No.: US 12,431,517 B2
(45) Date of Patent: Sep. 30, 2025

(54) FUEL CELL SYSTEM

(71) Applicants: Nissan Motor Co., Ltd., Yokohama (JP); RENAULT S.A.S., Boulogne-Billancourt (FR)

(72) Inventor: Kazuhide Shimada, Kanagawa (JP)

(73) Assignees: Nissan Motor Co., Ltd., Yokohama (JP); Renault S.A.S., Boulogne-Billancourt (FR)

(*) Notice: Subject to any disclaimer, the term of this patent is extended or adjusted under 35 U.S.C. 154(b) by 517 days.

(21) Appl. No.: 18/002,671

(22) PCT Filed: Jul. 21, 2020

(86) PCT No.: PCT/IB2020/000625
§ 371 (c)(1),
(2) Date: Dec. 21, 2022

(87) PCT Pub. No.: WO2022/018473
PCT Pub. Date: Jan. 27, 2022

(65) Prior Publication Data
US 2023/0299322 A1 Sep. 21, 2023

(51) Int. Cl.
*H01M 8/04* (2016.01)
*H01M 8/04014* (2016.01)
*H01M 8/04701* (2016.01)
*H01M 8/04746* (2016.01)
*H01M 8/2418* (2016.01)

(52) U.S. Cl.
CPC ... *H01M 8/04708* (2013.01); *H01M 8/04014* (2013.01); *H01M 8/04753* (2013.01); *H01M 8/2418* (2016.02)

(58) Field of Classification Search
CPC ........ H01M 8/04708; H01M 8/04014; H01M 8/04753; H01M 8/2418
USPC ........................................... 429/434
See application file for complete search history.

(56) References Cited

U.S. PATENT DOCUMENTS

| | | | |
|---|---|---|---|
| 2012/0021314 A1* | 1/2012 | Crumm | H01M 8/0271 429/423 |
| 2012/0034538 A1 | 2/2012 | Jahnke et al. | |
| 2013/0149621 A1* | 6/2013 | McAlister | H01M 8/0687 429/427 |
| 2016/0181647 A1* | 6/2016 | Lambrech | H01M 8/0491 429/415 |
| 2019/0296375 A1* | 9/2019 | Taku | H01M 8/2425 |

* cited by examiner

*Primary Examiner* — James M Erwin
(74) *Attorney, Agent, or Firm* — Global IP Counselors LLP; David Tarnoff (57) ABSTRACT

A fuel cell system includes a fuel cell module and an oxidant gas temperature adjustment device for adjusting a temperature of an oxidant gas supplied to the fuel cell module. The fuel cell module includes a first fuel cell and a second fuel cell. The first fuel cell is at least configured to reform a fuel gas. The fuel cell system includes a temperature control unit for setting a target temperature of the oxidant gas supplied to the fuel cell module such that a temperature of the first fuel cell and a temperature of the second fuel cell do not exceed a prescribed upper-limit temperature and controlling the oxidant gas temperature adjustment device based on of the target temperature, and the temperature control unit calculates the target temperature.

5 Claims, 6 Drawing Sheets

FUEL CELL SYSTEM

CROSS-REFERENCE TO RELATED APPLICATIONS

This application is a U.S. national stage application of International Application No. PCT/IB2020/000625, filed on Jul. 21, 2020.

BACKGROUND

Technical Field

The present invention relates to a fuel cell system.

Background Information

US 2012/0034538 A discloses a fuel cell system provided with a first fuel cell and a second fuel cell that are arranged in series, wherein the fuel cell system is configured to increase a flow rate of air supplied to a cathode when a temperature of the second fuel cell rises, and, when a temperature of the first fuel cell rises, to either increase the flow rate of air supplied to the cathode or increase a flow rate of air in a bypass flow path, which bypasses the second fuel cell and connects to the first fuel cell, thereby adjusting the temperatures of the first and second fuel cells.

SUMMARY

However, when implementing the configuration described above, it is necessary to detect the temperature of the first fuel cell and detect the temperature of the second fuel cell. Typically, when detecting the temperature of a fuel cell, it is a temperature at an outlet of a cathode in the fuel cell that is detected. However, arranging a sensor at a cathode outlet in the second fuel cell, i.e., between the first and second fuel cells, results in an increase in size in the system or an increase in cost.

It is accordingly an object of the present invention to provide a fuel cell system that includes fuel cells arranged in series, the fuel cell system making it possible to adjust temperatures of the fuel cells using a simple configuration.

According to one aspect of the present invention, there is provided a fuel cell system including: a fuel cell module that includes a first fuel cell and a second fuel cell arranged in series, a fuel gas circulating in a direction from the first fuel cell toward the second fuel cell, and an oxidant gas circulating in a direction from the second fuel cell toward the first fuel cell; and an oxidant gas temperature adjustment device for adjusting a temperature of the oxidant gas supplied to the fuel cell module, it being possible, at a minimum, for the first fuel cell to reform the fuel gas, wherein the fuel cell system includes a temperature control means for setting a target temperature of the oxidant gas supplied to the fuel cell module such that a temperature of the first fuel cell and a temperature of the second fuel cell do not exceed a prescribed upper-limit temperature and controlling the oxidant gas temperature adjustment device based on the target temperature, and the temperature control means calculating the target temperature T as T=Tmax−ΔT1−ΔT2 (ΔT1>0), T=Tmax−ΔT2 (ΔT1≤0), or T=Tmax (ΔT2<0 and ΔT1+ΔT2<0), where T is the target temperature, Tmax is the upper-limit temperature, ΔT1 is a difference obtained by subtracting a temperature at an inlet of the first fuel cell from a temperature at an outlet thereof, and ΔT2 is a difference obtained by subtracting a temperature at an inlet of the second fuel cell from a temperature at an outlet thereof.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the accompanying drawings.

Basic Operation of Fuel Cell System

Figure 1:
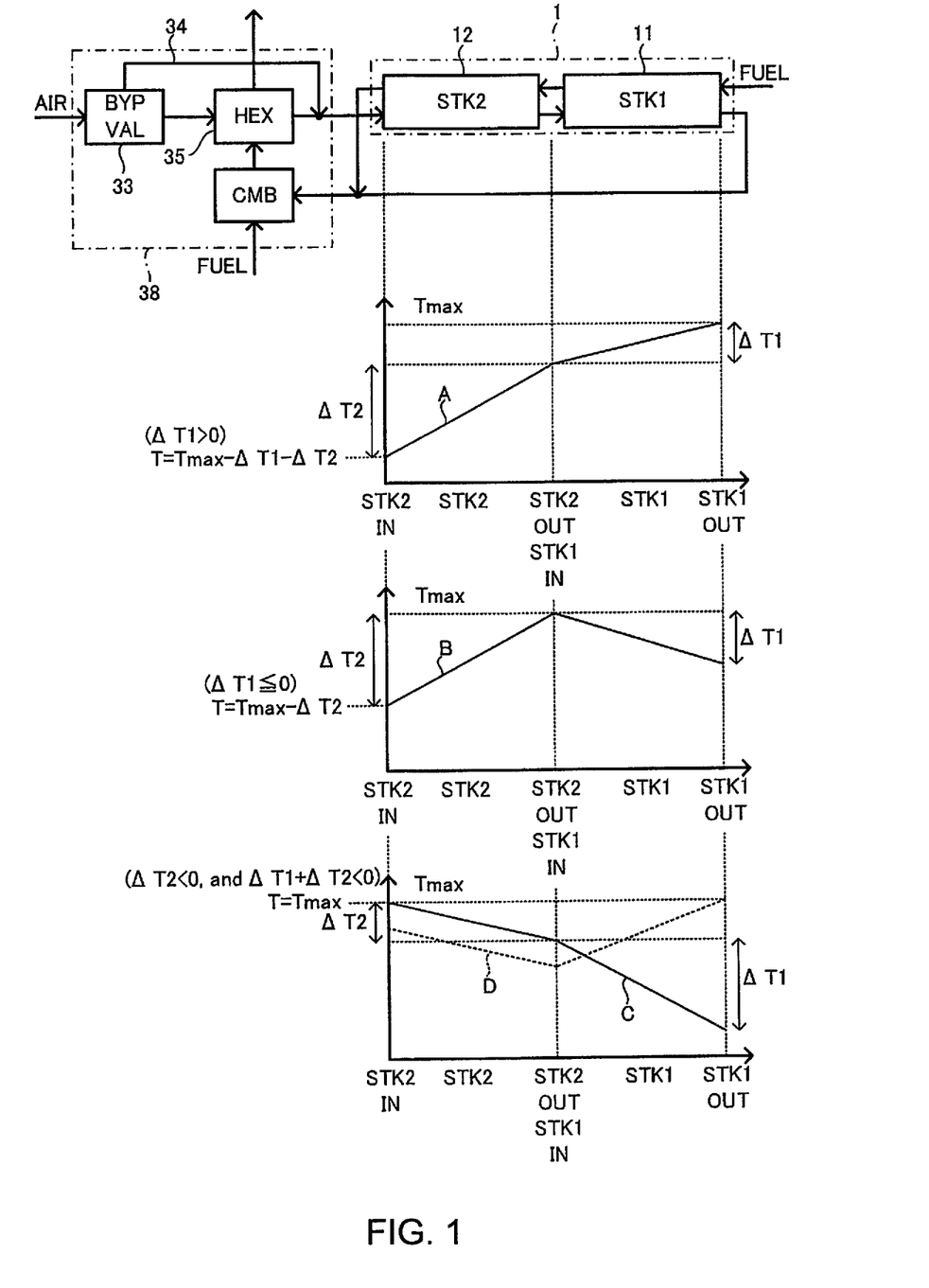
FIG. 1 is a block diagram for illustrating the present invention in a simple manner, and graphs showing temperature distributions within a fuel cell stack.

FIG. 1 includes a block diagram for illustrating the present invention in a simple manner, and graphs showing temperature distributions within a fuel cell stack.

As shown in FIG. 1, a fuel cell system according to the present invention is provided with a fuel cell module 1 in which two fuel cell stacks, specifically a first fuel cell stack 11 (first fuel cell, STK1) and a second fuel cell stack 12 (second fuel cell, STK2), are arranged in series in a gas flow path, the fuel cell module 1 being configured such that an anode gas (fuel gas) flows from the first fuel cell stack 11 to the second fuel cell stack 12, and such that a cathode gas (oxidant gas) flows from the second fuel cell stack 12 to the first fuel cell stack 11. Specifically, in the fuel cell module 1, the anode gas and the cathode gas circulate in opposite directions between the first fuel cell stack 11 and the second fuel cell stack 12; i.e., between the two stacks.

In the fuel cell module 1, an anode inlet in the first fuel cell stack 11 serves as an inlet for the anode gas, and a cathode inlet in the second fuel cell stack 12 serves as an inlet for the cathode gas. An anode outlet in the first fuel cell stack 11 and an anode inlet in the second fuel cell stack 12 are connected to one another, and a cathode outlet in the second fuel cell stack 12 and a cathode inlet in the first fuel cell stack 11 are connected to one another.

Additionally, the fuel cell system according to the present invention is provided with a temperature adjustment device 38 (oxidant gas temperature adjustment device) for adjusting a temperature of the cathode gas supplied to the fuel cell module 1; this device is described in detail later.

In the fuel cell system according to the present invention, a catalyst capable of reforming the fuel gas is arranged in the first fuel cell stack 11 (and in the second fuel cell stack 12). The first fuel cell stack 11 reforms the fuel gas into a hydrogen-containing anode gas (reformed fuel), generates electric power by using the reformed anode gas and the cathode gas supplied from the second fuel cell stack 12, and supplies any surplus anode gas to the second fuel cell stack 12. Additionally, the cathode gas used in an electric power generation reaction is discharged to a combustor 4 constituting the temperature adjustment device 38 as a cathode off-gas.

The second fuel cell stack 12 generates electric power by using the anode gas supplied from the first fuel cell stack 11 and a cathode gas supplied from the temperature adjustment device 38. The second fuel cell stack 12 also supplies the cathode gas used in electric power generation to the first fuel cell stack 11 and supplies the anode gas used in electric power generation to the combustor 4 as an anode off-gas.

In the first fuel cell stack 11 and the second fuel cell stack 12, electric power generation efficiency improves as a temperature is raised. However, for heat resistance and other reasons, an upper-limit temperature (e.g., 800° C.) is set for the first fuel cell stack 11 and the second fuel cell stack 12.

Thus, it is necessary to adjust the temperature of the cathode gas such that the temperature of the first fuel cell stack 11 (temperature at an outlet of a cathode in the first fuel cell stack 11) and the temperature of the second fuel cell stack 12 (temperature at an outlet of a cathode in the second fuel cell stack 12) do not exceed the aforementioned upper-limit temperature and such that the electric power generation reaction is carried out adequately.

In the present invention, taking, e.g., a temperature at an inlet of the cathode (temperature of cathode gas at the cathode inlet) of the second fuel cell stack 12 as a target temperature, the temperature adjustment device 38 is controlled according to the target temperature such that the temperatures of the first fuel cell stack 11 and the second fuel cell stack 12 do not exceed the upper-limit temperature. This makes it possible to use fewer temperature-sensing means (temperature sensor 51 in FIG. 2) and reduce the system in size. The target temperature is computed by a target temperature computation unit 753 (FIG. 2) that shall be described later.

The electric power generation reactions occurring in the first fuel cell stack 11 and the second fuel cell stack 12 are exothermic, but a reforming reaction occurring in the first fuel cell stack 11 is endothermic. The cathode gas is heated using the temperature adjustment device 38, but depending on, inter alia, the magnitude of the electric power generation reactions and the reforming reaction, there are not only cases where the cathode gas is heated in the first fuel cell stack 11 and the second fuel cell stack 12 but also cases where the cathode gas is cooled. Therefore, as indicated in FIG. 1, there are cases where a temperature distribution of the cathode gas attains states as in A through D as described below.

A is a case in which a load (amount of electric power generated) on the first fuel cell stack 11 and the second fuel cell stack 12 is high, an amount of heat generated through the electric power generation reactions is sufficiently greater than an amount of heat absorbed through the reforming reaction in the first fuel cell stack 11, and furthermore, the temperatures (temperatures at the outlets of the cathodes) of the first fuel cell stack 11 and the second fuel cell stack 12 are greater than the temperature of the cathode gas supplied from the temperature adjustment device 38. In this case, the temperature of the cathode gas supplied from the temperature adjustment device 38 rises commensurately with proximity to a downstream side of a cathode gas flow path and reaches a highest temperature at the cathode outlet in the first fuel cell stack 11.

In the case in A, $\Delta T1>0$ and $\Delta T2>0$, where $\Delta T1$ is a difference obtained by subtracting the temperature at the inlet of the first fuel cell stack 11 from the temperature at the outlet thereof, and $\Delta T2$ is a difference obtained by subtracting the temperature at the inlet of the second fuel cell stack 12 from the temperature at the outlet thereof.

Therefore, the target temperature computation unit 753 (FIG. 2) calculates a target temperature T according to $T=Tmax-\Delta T1-\Delta T2$, where T is the target temperature and Tmax is the upper-limit temperature, thereby making it possible to set the temperature at the outlet of the cathode in the first fuel cell stack 11, which is the highest temperature, to the upper-limit temperature Tmax.

B is a case in which the load (amount of electric power generated) on the first fuel cell stack 11 and the second fuel cell stack 12 is lower than that in the case of A, e.g., in which the amount of heat absorbed through the reforming reaction in the first fuel cell stack 11 and the amount of heat generated through the electric power generation reactions are approximately equal. In this case, the temperature of the second fuel cell stack 12 is greater than the temperature of the cathode gas supplied from the temperature adjustment device 38, but the temperature of the first fuel cell stack 11 is equal to or less than the temperature of the cathode gas discharged from the second fuel cell stack 12. Thus, the temperature of the cathode gas reaches a highest temperature at the cathode outlet in the second fuel cell stack 12. In this circumstance, $\Delta T1 \leq 0$ and $\Delta T2>0$.

Therefore, the target temperature computation unit 753 (FIG. 2) calculates the target temperature T according to $T=Tmax-\Delta T2$, thereby making it possible to set the temperature at the outlet of the cathode in the second fuel cell stack 12 (i.e., the temperature at the inlet of the cathode in the first fuel cell stack 11), which is the highest temperature, to the upper-limit temperature Tmax.

C is a case in which the load (amount of electric power generated) on the first fuel cell stack 11 and the second fuel cell stack 12 abruptly decreases and the temperature of the second fuel cell stack 12 falls below the temperature of the cathode gas supplied from the temperature adjustment device 38. In this case, a temperature distribution in which $\Delta T2<0$ and $\Delta T1+\Delta T2<0$ can be produced. This includes cases in which $\Delta T1$ satisfies the relationship $\Delta T1<0$, or cases in which $\Delta T1$ satisfies the relationship $\Delta T1>0$ and the absolute value thereof is less than $\Delta T2$. In the case in C, the temperature of the cathode gas reaches a highest temperature at the cathode inlet in the second fuel cell stack 12.

Therefore, the target temperature computation unit 753 (FIG. 2) calculates the target temperature T according to $T=Tmax$, thereby making it possible to set the temperature at the inlet of the cathode in the second fuel cell stack 12, which is the highest temperature, to the upper-limit temperature Tmax.

D is a scenario similar to that in C, occurring in a case in which, for example, a heat capacity of the first fuel cell stack 11 is greater than a heat capacity of the second fuel cell stack 12 and there is little reduction in the temperature of the first fuel cell stack 11. In this case, a temperature distribution in which $\Delta T2<0$ but $\Delta T1+\Delta T2 \geq 0$ is produced. In the case in D, the temperature at the outlet of the cathode in the first fuel cell stack 11 is a highest temperature.

Therefore, the target temperature computation unit 753 (FIG. 2) calculates the target temperature T according to $T=Tmax-\Delta T1-\Delta T2$, thereby making it possible to set the temperature at the outlet of the cathode in the first fuel cell stack 11, which is the highest temperature, to the upper-limit temperature Tmax. Because $\Delta T1>0$, the conditions for setting the target temperature T in D are the same as in A.

$\Delta T1$ and $\Delta T2$ can be calculated as shall be described later. Therefore, the position having the highest temperature in the first fuel cell stack 11 and the second fuel cell stack 12 is assessed by calculating ΔT1 and ΔT2 in accordance with, inter alia, the load on the first fuel cell stack 11 and the second fuel cell stack 12, and an equation for computing the target temperature T is switched such that the temperature at the aforementioned position can be set to the upper-limit temperature Tmax. This makes it possible to prevent excessive temperatures and realize an increase in temperature in the first fuel cell stack 11 and the second fuel cell stack 12.

As described above, the target temperature computation unit 753 (FIG. 2) is capable of calculating the target temperature T according to the circumstances, as indicated in formula 1 below.

$$T \begin{cases} = T\max - \Delta T1 - \Delta T2 (\Delta T1 > 0) \\ = T\max - \Delta T2 (\Delta T1 \leq 0) \\ = T\max (\Delta T2 < 0, \Delta T1 + \Delta T2 < 0) \end{cases} \quad \text{[Formula 1]}$$

It is also possible to employ the temperature at the outlet of the cathode (the temperature of the cathode gas at the cathode) in the first fuel cell stack 11 as the target temperature T. In this case, the target temperature computation unit 753 (FIG. 2) is capable of calculating the target temperature T according to the circumstances, as indicated in formula 2 below, with reference to FIG. 1.

$$T \begin{cases} = T\max (\Delta T1 > 0) \\ = T\max + \Delta T1 (\Delta T1 \leq 0) \\ = T\max + \Delta T1 + \Delta T2 (\Delta T2 < 0, \Delta T1 + \Delta T2 < 0) \end{cases} \quad \text{[Formula 2]}$$

Configuration of Present Embodiment

Figure 2:
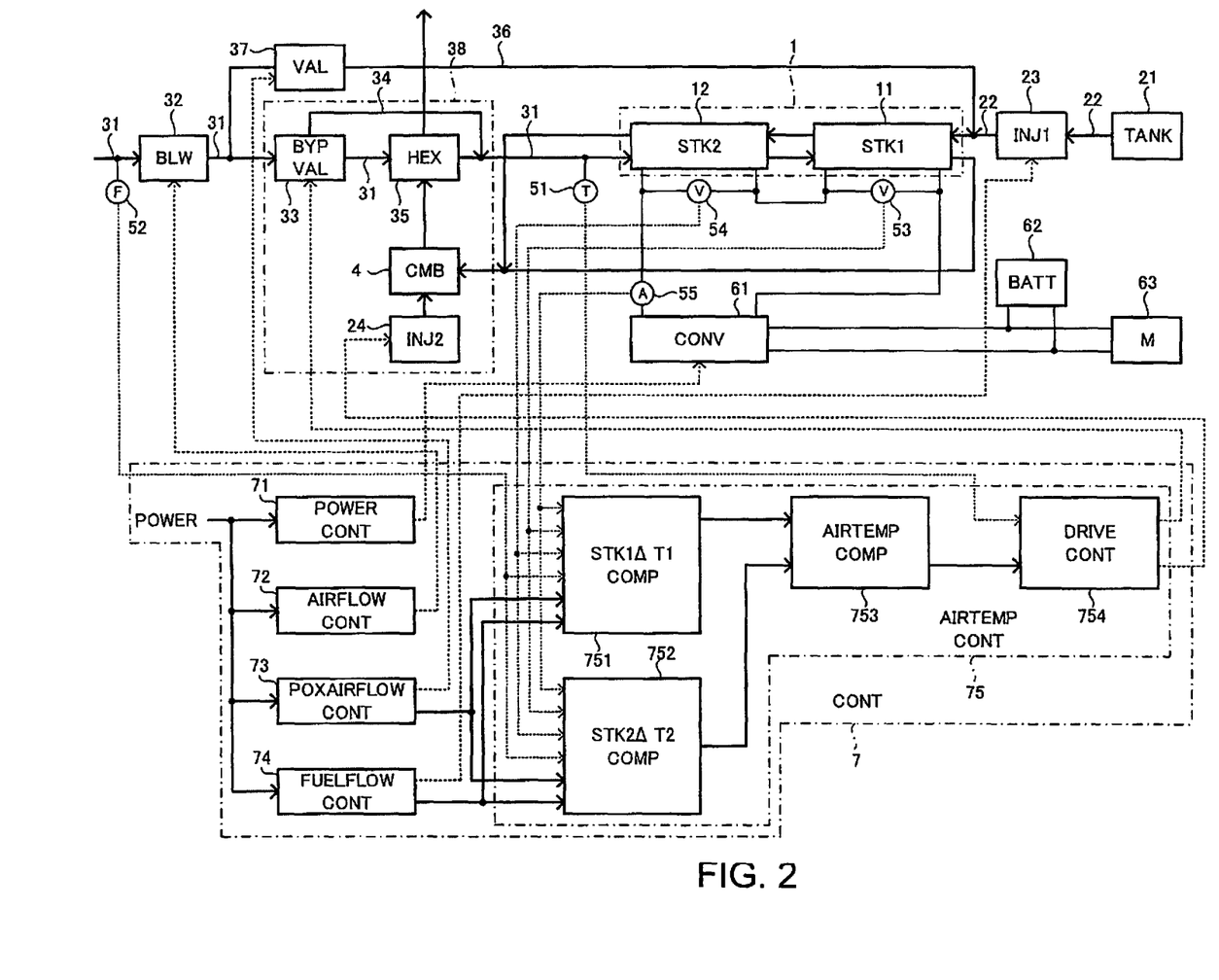
FIG. 2 is a block diagram showing a principal configuration of a fuel cell system according to the present embodiment.

FIG. 2 is a block diagram showing a principal configuration of the fuel cell system according to the present embodiment.

The fuel cell system according to the present embodiment is configured from a fuel supply sub-system for supplying the anode gas to the fuel cell module 1, an air supply sub-system for supplying air (cathode gas) to the fuel cell module 1, a combustion sub-system for combusting the anode off-gas (anode gas) and the cathode off-gas (cathode gas) discharged from the fuel cell module 1, a drive sub-system for extracting electric power from the fuel cell module 1 and obtaining motive power, and a control sub-system for controlling the entire system. The fuel cell system is mainly mounted in a vehicle (electric-powered vehicle).

The fuel supply sub-system includes a tank 21 (TANK), an injector 23 (INJ1), and an injector 24 (INJ2). The air supply sub-system includes a blower 32 (BLW), a bypass valve 33 (BYP VAL), a heat exchanger 35 (HEX), and a variable valve 37 (VAL). The combustion sub-system includes the combustor 4 (CMB). The bypass valve 33, the heat exchanger 35, the combustor 4, and the injector 24 constitute the temperature adjustment device 38.

The drive sub-system includes a DC/DC converter 61 (CONV), a battery 62 (BATT), and a drive motor 63 (M). The control sub-system includes a control unit 7 (CONT) for controlling the entire system.

The first fuel cell stack 11 and the second fuel cell stack 12 constituting the fuel cell module 1 are solid oxide fuel cells (SOFCs), are each provided with an electrolyte layer formed from a solid oxide such as a ceramic material, and are formed by stacking cells obtained by sandwiching the electrolyte layer between an anode (fuel electrode) by which the anode gas (reformed gas) is supplied and a cathode (air electrode) by which oxygen-containing air serving as the cathode gas (oxidant gas) is supplied.

A catalyst for reforming fuel for reformation, which is supplied from the injector 23 side, into the hydrogen-containing anode gas (reformed fuel gas) is arranged in the electrolyte layer of the first fuel cell stack 11 (and that of the second fuel cell stack 12).

In the first fuel cell stack 11, hydrogen included in the anode gas and oxygen in the cathode gas are reacted to generate electric power, any surplus anode gas is supplied to the second fuel cell stack 12, and the cathode off-gas is discharged to the combustor 4.

In the second fuel cell stack 12, the anode gas supplied from the first fuel cell stack 11 and the cathode gas supplied from the blower 32 via the temperature adjustment device 38 are reacted to generate electric power, any surplus cathode gas is supplied to the first fuel cell stack 11, and the anode off-gas is discharged to the combustor 4.

The anode includes not only an anode electrode in the first fuel cell stack 11 and the second fuel cell stack 12 but also an internal flow path for supplying the anode gas to the anode electrode and an internal flow path for discharging post-reaction anode off-gas in the anode electrode. Similarly, the cathode includes not only a cathode electrode in the first fuel cell stack 11 and the second fuel cell stack 12 but also an internal flow path for supplying the cathode gas to the cathode electrode and an internal flow path for discharging post-reaction cathode off-gas in the cathode electrode.

In the fuel supply sub-system, the tank 21 stores fuel (gas) composed of methane, or a natural gas mainly composed of methane, under high pressure. The fuel is supplied to the injector 23 as fuel for reformation, and also is supplied to the injector 24 as additional fuel for combustion.

The fuel supply sub-system has a fuel flow path 22 (main flow path) for supplying the fuel for reformation from the tank 21 to the anode in the first fuel cell stack 11 via the injector 23.

Additionally, a sub-flow path (not shown) branches from the fuel flow path 22 and connects to the injector 24.

The injectors 23, 24 are each provided with: a nozzle body (not shown) into which the fuel is introduced under pressure; a plunger rod (not shown) biased in a direction for closing a fuel injection orifice (not shown), which is located at a distal end of the nozzle body; and a solenoid (not shown) for causing the plunger rod to move in a direction opposing the biasing direction.

In the injectors 23, 24, applying a command signal (electric current) to the solenoid results in the solenoid being driven to cause the plunger rod to move in the opposing direction, whereby the plunger rod opens the fuel injection orifice, and the fuel is injected. Stopping the command signal (electric current) stops the driving of the solenoid, whereby the plunger rod moves due to biasing force and closes the fuel injection orifice, and injection of the fuel is stopped.

Additionally, in the injectors 23, 24, a duty ratio at which the fuel injection orifice is opened/closed depends on a duty ratio at which the command signal (electric current) is turned on/off. Thus, the injectors 23, 24 are capable of adjusting a flow rate of fuel being injected by adjusting the duty ratio of the command signal (electric current).

The air supply sub-system has an air flow path 31 for supplying the cathode gas (air) to the cathode of the second fuel cell stack 12. The blower 32, the bypass valve 33, and the heat exchanger 35 are arranged in the air flow path 31 in the stated order from the upstream side.

The blower 32 (oxidant gas supply source) takes in outside air and supplies the air (cathode gas) to the air flow path 31, etc.

The heat exchanger 35 communicates with the cathode of the second fuel cell stack 12 via the air flow path 31, carries out heat exchange (heating) of the cathode gas by using combustion gas discharged from the combustor 4, and supplies the heat-exchanged cathode gas to the cathode of the second fuel cell stack 12. The heat-exchanged combustion gas is discharged to outside.

The bypass valve 33 (flow rate adjustment means) is arranged at a position in the air flow path 31 that is upstream from the heat exchanger 35. An upstream side of the bypass valve 33 is connected to the blower 32, and a downstream side of the bypass valve 33 is connected to the air flow path 31 (heat exchanger 35) and a bypass flow path 34. Adjusting an opening degree of the bypass valve 33 adjusts a proportion of flow rates of the cathode gas (air) in the air flow path 31 and the bypass flow path 34. The bypass flow path 34 bypasses the heat exchanger 35 and merges with the air flow path 31 at a position in the air flow path 31 that is between the heat exchanger 35 and the cathode of the second fuel cell stack 12.

Additionally, a supply path 36 branches from a position in the air flow path 31 that is upstream from the bypass valve 33. The supply path 36 merges with the fuel flow path 33 at a position in the fuel flow path 22 that is between the first fuel cell stack 11 and the injector 23.

The variable valve 37 is arranged in the supply path 36 and adjusts the flow rate of air (oxygen) circulating through the supply path 36. When the air (oxygen) is supplied to the anode of the first fuel cell stack 11, a partial oxidation reaction (heat generation reaction) is caused to occur between the anode gas and the oxygen via a catalyst arranged in the first fuel cell stack 11 (this catalyst optionally being the same as the catalyst that carries out the reformation reaction), and the temperature of the first fuel cell stack 11 can be raised. This makes it possible to avoid a circumstance in which a partial-oxidation-reaction air flow rate control unit 73, which shall be described later, reduces the temperature of the first fuel cell stack 11 below a lower-limit value for a temperature at which the reformation reaction can be carried out. In this procedure, the blower 32 functions as an oxygen supply source.

The supply path 36 furthermore can also be connected to the anode inlet in the second fuel cell stack 12 and can enable a partial oxidation reaction in the second fuel cell stack 12 as well. When the partial oxidation reaction is unnecessary in the first fuel cell stack 11 and the second fuel cell stack 12, the supply path 36 and the variable valve 37 (as well as the partial-oxidation-reaction air flow rate control unit 73 that shall be described later) can be omitted.

In the combustion sub-system, the combustor 4 communicates with the anode outlet in the first fuel cell stack 11 and the cathode outlet in the second fuel cell stack 12. A mixed gas of the anode off-gas and the cathode off-gas is introduced into the combustor 4. The combustor 4 catalytically combusts the mixed gas and produces the combustion gas. The combustor 4 is provided with a catalyst (not shown) for carrying out the catalytic combustion, and a heater (not shown) for warming the catalyst (not shown) until the fuel reaches a temperature at which combustion is possible. Additional fuel is also supplied to the combustor 4 from the injector 24. Thus, the combustor 4 prompts combustion of the additional fuel while combusting the mixed gas and combusting the combustion gas, thereby making it possible to further increase the temperature of the combustion gas.

In the temperature adjustment device 38 (bypass valve 33, heat exchanger 35, combustor 4, and injector 24), supplying additional fuel to the combustor 4 and raising the temperature of the combustion gas makes it possible to raise the temperature of the cathode gas circulating through the heat exchanger 35, or increasing/reducing the flow rate of the cathode gas flowing through the bypass flow path 34 makes it possible to reduce/increase the temperature of the cathode gas supplied to the fuel cell module 1.

The temperature sensor 51 detects the temperature at the inlet of the cathode in the second fuel cell stack 12. The temperature sensor 51 can be disposed at the cathode outlet in the first fuel cell stack 11.

A flow rate sensor 52 detects a flow rate of the air (cathode gas) taken in by the blower 32.

A first voltage sensor 53 detects an output voltage of the first fuel cell stack 11.

A second voltage sensor 54 detects an output voltage of the second fuel cell stack 12.

The first fuel cell stack 11 and the second fuel cell stack 12 are electrically connected in series.

A current sensor 55 detects an output current flowing between the first fuel cell stack 11 and second fuel cell stack 12, which are connected in series, and the DC/DC converter 61.

The DC/DC converter 61 is connected to a series circuit including the first fuel cell stack 11 and the second fuel cell stack 12, the DC/DC converter 61 boosting an output voltage of the series circuit and supplying electric power to the battery 62 or the drive motor 63.

It is also possible to extract electric power from the first fuel cell stack 11 and the second fuel cell stack 12 individually, without the first fuel cell stack 11 and the second fuel cell stack 12 being electrically connected. In this case, it is possible to prepare two DC/DC converters 61, one of the DC/DC converters 61 being connected to the first fuel cell stack 11 and the other of the DC/DC converters 61 being connected to the second fuel cell stack 12, and to furthermore adopt a configuration in which the two DC/DC converters 61 are connected to the battery 62 and the drive motor 63.

The battery 62 is capable of charging using electric power supplied from the DC/DC converter 61 and supplying electric power to the drive motor 63.

The drive motor 63 serves as a motive power source for a vehicle and is connected to the battery 62 and the DC/DC converter 61 via an inverter (not shown). While the vehicle is decelerating, the drive motor 63 generates regenerative electric power, the drive motor 63 being capable of charging the battery 62 using the regenerative electric power.

The control unit 7 is configured from: a general-purpose electronic circuit including a microcomputer, a microprocessor, and a CPU; and peripheral accessories. The control unit 7 executes a specific program, thereby executing a process for controlling the fuel cell system.

The control unit 7 includes an extracted-electric-power control unit 71 (POWER CONT), an air flow rate control unit 72 (AIRFLOW CONT), the partial-oxidation-reaction air flow rate control unit 73 (POXAIRFLOW CONT), a fuel flow rate control unit 74 (FUELFLOW CONT), and an air temperature control unit 75 (AIRTEMP CONT). The control unit 7 is also provided with a computation unit (not shown) for calculating a target extracted electric power (POWER) based on a state of charge (SOC) of the battery 62 and a drive request (accelerator position) from a driver.

The control unit 7 is capable of controlling startup and stopping of the fuel cell system, but these controls are prior-art features and therefore are not described here.

The extracted-electric-power control unit 71, upon receiving input of information pertaining to a target extracted electric power, outputs a command signal to the DC/DC converter 61 such that electric power extracted from the fuel cell module 1 reaches the target extracted electric power. The electric power extracted from the fuel cell module 1 is supplied to the battery 62 or the drive motor 63.

Figure 3:
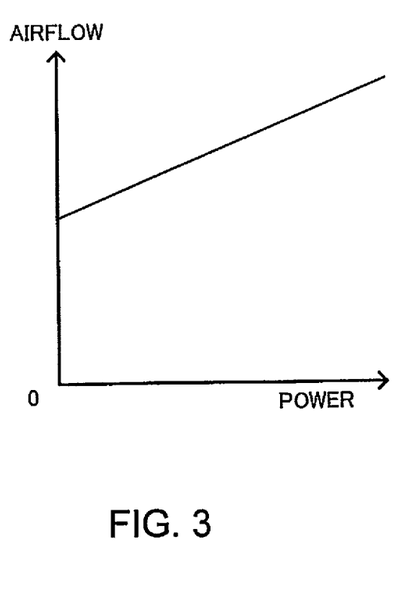
FIG. 3 is a map showing a relationship between a target air flow rate and a target extracted electric power.
Figure 4:
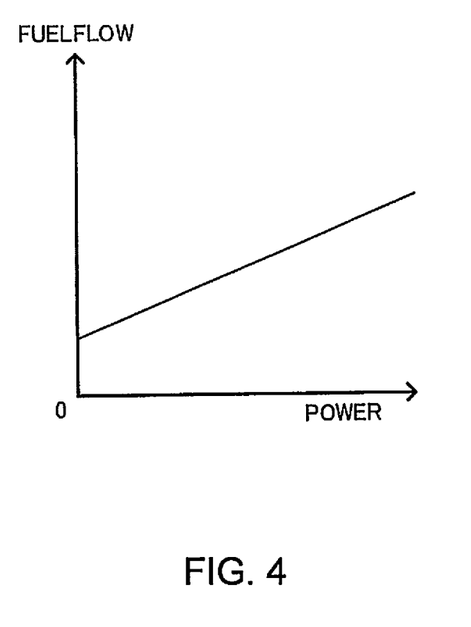
FIG. 4 is a map showing a relationship between a target fuel flow rate and the target extracted electric power.
Figure 5:
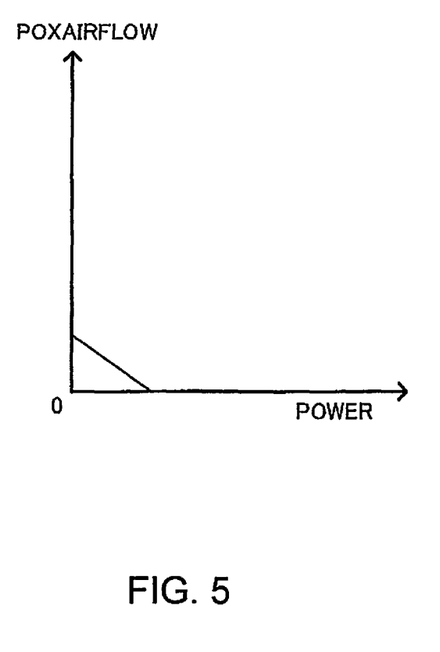
FIG. 5 is a Map showing a relationship between a target partial-oxidation-reaction air flow rate and the target extracted electric power.

FIG. 3 is a map showing a relationship between a target air flow rate and the target extracted electric power. FIG. 4 is a map showing a relationship between a target fuel flow rate and the target extracted electric power. FIG. 5 is a map showing a relationship between a target partial-oxidation-reaction air flow rate and the target extracted electric power.

The air flow rate control unit 72, upon receiving input of information pertaining to the target extracted electric power, outputs, to the blower 32, a command signal for attaining a target air flow rate. The target air flow rate is an air flow rate with which it is possible to ensure both an oxygen amount required for the fuel cell module 1 to generate the target extracted electric power and an oxygen amount required for the anode off-gas discharged from the fuel cell module 1 to be combusted using the combustor 4.

The relationship between the target extracted electric power and the target air flow rate is set in advance according to experimentation or theoretical investigation. The air flow rate control unit 72 can thereby be provided with a map in which the target extracted electric power (POWER) is employed as an input value and the target air flow rate (AIRFLOW) is employed as an output value, as shown in FIG. 3. This makes it possible for the air flow rate control unit 72 to determine a target air flow rate that corresponds to the target extracted electric power.

The fuel flow rate control unit 74, upon receiving input of information pertaining to the target extracted electric power, outputs, to the injector 23, a command signal for attaining a target fuel flow rate. The target fuel flow rate is a fuel flow rate that ensures a fuel usage ratio with which it is possible to stably generate electric power in the fuel cell module 1 in order to generate the target extracted electric power.

The relationship between the target extracted electric power and the target fuel flow rate is set in advance according to experimentation or theoretical investigation. The fuel flow rate control unit 74 can thereby be provided with a map in which the target extracted electric power (POWER) is employed as an input value and the target fuel flow rate (FUELFLOW) is employed as an output value, as shown in FIG. 4. This makes it possible for the fuel flow rate control unit 74 to determine a target fuel flow rate that corresponds to the target extracted electric power.

The partial-oxidation-reaction air flow rate control unit 73, upon receiving input of information pertaining to the target extracted electric power, outputs, to the variable valve 37, a command signal for reaching an opening degree in the variable valve 37 such that a target partial-oxidation-reaction air flow rate is attained. The target partial-oxidation-reaction air flow rate is a flow rate of air supplied to the first fuel cell stack 11 such that the temperature of the first fuel cell stack 11 does not become too low (e.g., such that the aforementioned temperature does not fall below a lower-limit temperature at which the reformation reaction can be carried out) based on the target extracted electric power.

The relationship between the target extracted electric power and the target partial-oxidation-reaction air flow rate is set in advance according to experimentation or theoretical investigation. The partial-oxidation-reaction air flow rate control unit 73 can thereby be provided with a map in which the target extracted electric power (POWER) is employed as an input value and the target partial-oxidation-reaction air flow rate (POXAIRFLOW) is employed as an output value, as shown in FIG. 5. This makes it possible for the partial-oxidation-reaction air flow rate control unit 73 to determine a target partial-oxidation-reaction air flow rate that corresponds to the target extracted electric power.

The air temperature control unit 75 (temperature control means) includes a first temperature difference computation unit 751 (STK1ΔT1 COMP), a second temperature difference computation unit 752 (STK2ΔT2 COMP), the target temperature computation unit 753 (AIRTEMP COMP), and a drive control unit 754 (DRIVE CONT).

The first temperature difference computation unit 751, upon receiving input of various information pertaining to the target fuel flow rate, the target partial-oxidation-reaction air flow rate, the flow rate of air detected by the flow rate sensor 52, the voltage sensed by the first voltage sensor 53, the voltage sensed by the second voltage sensor 54, and the electric current detected by the current sensor 55, calculates, as in formula 3 below, a difference ΔT1 obtained by subtracting the temperature at the inlet of the cathode in the first fuel cell stack 11 from the temperature at the outlet of the cathode therein.

$$\Delta T1 = \frac{(Pp1 - Pr1 - Pd1 + Po1)}{(\sigma \times c \times Q)} \quad \text{[Formula 3]}$$

In the formula, Pp1 (W) is the amount of heat generated through generation of electric power in the first fuel cell stack 11. Pp1 is calculated using a map in which an amount of heat generated that corresponds to the electric power generated in the first fuel cell stack 11 is obtained in advance through experimentation or theoretical investigations (map in which the amount of electric power generated is employed as an input value and the amount of heat generated is employed as an output value). The amount of electric power generated in the first fuel cell stack 11 is obtained by multiplying the voltage sensed by the first voltage sensor 53 (more precisely, the amount of reduction from an open voltage of the first fuel cell stack 11) and the electric current detected by the current sensor 55.

Pr1 (W) is the amount of heat absorbed through the reformation reaction occurring in the first fuel cell stack 11. A reaction formula for the reformation reaction is $CH_4 + 2H_2O \rightarrow 4H_2 + CO_2 - 165$ (kJ/mol) and is proportional to a $CH_4$ flow rate (mol/s). Additionally, in the partial oxidation reaction, 2 mol of $CH_4$ is eliminated per mole of oxygen. Thus, the flow rate of $CH_4$ after the partial oxidation reaction is a difference obtained by subtracting double a flow rate of oxygen within the target partial-oxidation-reaction air flow rate (i.e., the flow rate of $CH_4$ eliminated in the partial oxidation reaction) from the flow rate of $CH_4$ before the partial oxidation reaction.

Therefore, the first temperature difference computation unit 751 calculates Pr1 according to, e.g., the formula (amount of heat absorbed through reformation reaction per mole of fuel for reformation (165 (kJ)))×((target fuel flow rate (mol/s))−(oxygen flow rate (mol/s) within target partial-oxidation-reaction air flow rate)×2). The oxygen flow rate is computed as being 21% of the air flow rate.

However, it is not necessarily the case that all of the fuel for reformation will be reformed; an amount that is reformed can change depending on a reaction speed of the reformation reaction. Thus, because the reformation amount can also vary in accordance with a pressure or flow rate of the fuel for reformation, it is possible for these amounts to be detected and Pr corrected according to the results therefrom, or for a composition of the anode gas at the anode inlet and anode outlet in the first fuel cell stack 11 to be detected and Pr corrected according to the results therefrom.

Pd1 (W) is a fixed amount of heat released to the outside from elsewhere besides the anode gas and the cathode gas in the first fuel cell stack 11. Pd1 is calculated using a map obtained in advance through experimentation or theoretical investigation.

Po1 is an amount of heat generated when the partial oxidation reaction is carried out in the first fuel cell stack 11. A reaction formula for the partial oxidation reaction is $2CH_4+O_2 \rightarrow CO+4H_2+70$ (kJ/mol) and is proportional to an oxygen flow rate (mol/s). Thus, the first temperature difference computation unit 751 calculates Po1 according to, e.g., the formula (amount of heat generated through partial oxidation reaction per mole of oxygen eliminated (70 (kJ)))× (oxygen flow rate (mol/s) within target partial-oxidation-reaction air flow rate).

$\sigma$ [kg/m3] is an air density, and c (kJ/kg·° C.) is a specific heat of the air. Fixed values derived in advance through experimentation or theoretical investigation are used for these variables with respect to the air supplied to the fuel cell module 1. It is also possible to detect a pressure and temperature of the air and compute the aforementioned variables through estimation.

Q (m³/s) is the flow rate of the air taken in by the blower 32. A value sensed by the flow rate sensor 52 is used for this variable.

Upon calculating $\Delta T1$, the first temperature difference computation unit 751 outputs $\Delta T1$ to the target temperature computation unit 753.

The second temperature difference computation unit 752, upon receiving input of the same information as that inputted to the first temperature difference computation unit 751, calculates, as in formula 4 below, a difference $\Delta T2$ obtained by subtracting the temperature at the inlet of the cathode in the second fuel cell stack 12 from the temperature at the outlet of the cathode therein, in the same manner as with $\Delta T1$.

$$\Delta T2 = \frac{(Pp2 - Pr2 - Pd2 + Po2)}{(\sigma \times c \times Q)} \quad \text{[Formula 4]}$$

Pp2 (W) is the amount of heat generated through generation of electric power in the second fuel cell stack 12. Pp2 is calculated through the same method as Pp1. Pd2 (W) is a fixed amount of heat released to the outside from elsewhere besides the anode gas and the cathode gas in the second fuel cell stack 12. Pd2 is calculated through the same method as Pd1.

When the reformation reaction is not carried out in the second fuel cell stack 12, Pr2 (W) is zero, but when the reformation reaction is carried out, Pr2 is calculated through the same method as Pr1. When the partial oxidation reaction is not carried out in the second fuel cell stack 12, Po2 (W) is zero, but when the partial oxidation reaction is carried out, Po2 is calculated through the same method as Po1.

Upon calculating $\Delta T2$, the second temperature difference computation unit 752 outputs $\Delta T2$ to the target temperature computation unit 753.

Formulas 3 and 4 above depend on the target extracted electric power. Therefore, the first temperature difference computation unit 751 can be provided with a map in which the target extracted electric power is employed as an input value and $\Delta T1$ is employed as an output value, whereby the first temperature difference computation unit 751 can calculate $\Delta T1$ that corresponds to the target extracted electric power. Similarly, the second temperature difference computation unit 752 can be provided with a map in which the target extracted electric power is employed as an input value and $\Delta T2$ is employed as an output value, whereby the second temperature difference computation unit 752 can calculate $\Delta T2$ corresponding to the target extracted electric power.

The target temperature computation unit 753, upon receiving input of information pertaining to $\Delta T1$ and $\Delta T2$, calculates the target temperature T of the air (cathode gas) in accordance with formula 1 (or 2) above and outputs the target temperature T to the drive control unit 754.

Information pertaining to the target temperature T and information pertaining to the temperature sensed by the temperature sensor 51 are inputted to the drive control unit 754. The drive control unit 754 then outputs a command signal to the injector 24 and the bypass valve 33 such that, for example, the temperature of the cathode gas reaches the target temperature T through PI control using, e.g., a difference obtained by subtracting the sensed temperature from the target temperature T. For example, when the sensed temperature is lower than the target temperature T, a command signal for increasing an amount of additional fuel (raising a duty ratio) is outputted to the injector 24 (additional fuel supply means) in order to raise the temperature of the cathode gas. Conversely, when the sensed temperature is greater than the target temperature T, a command signal for controlling an opening degree is outputted to the bypass valve 33 in order to increase the flow rate of the cathode gas bypassing the heat exchanger 35 and reduce the temperature of the cathode gas. Either of the command signal to the injector 24 and the command signal to the bypass valve 33 can be outputted alone, or both of these command signals can be outputted simultaneously.

Control Flow

Figure 6:
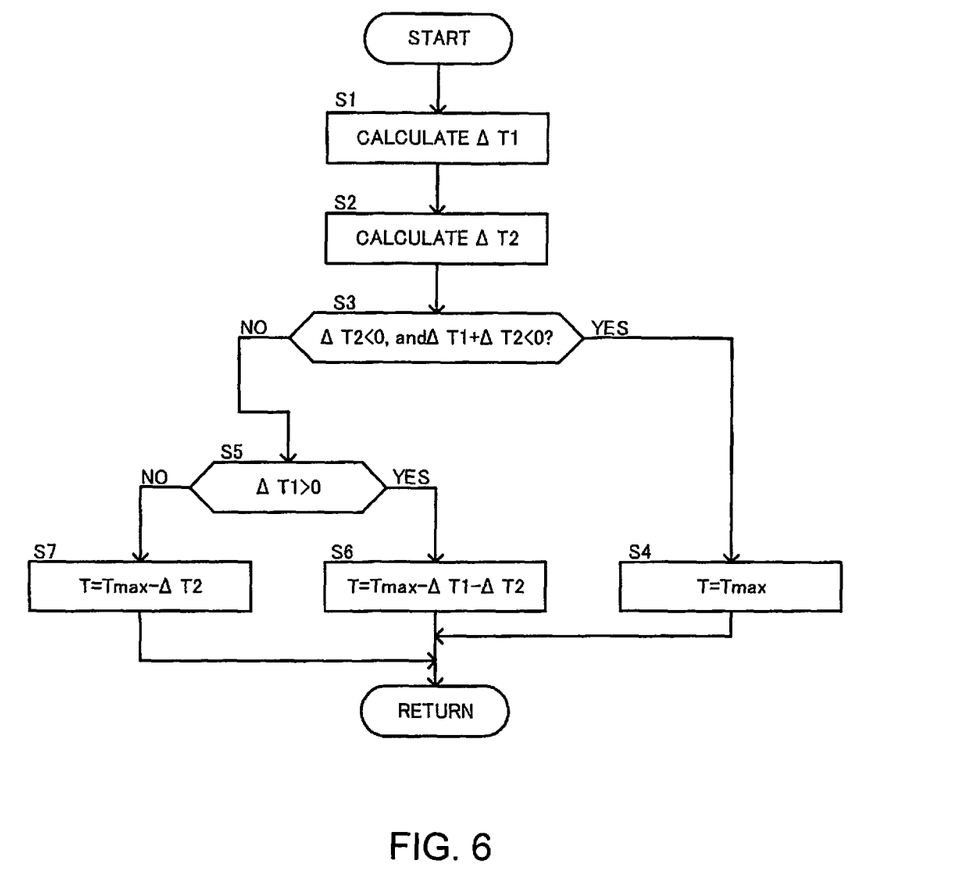
FIG. 6 is a control flow chart for an air temperature control unit.

FIG. 6 is a control flow chart for the air temperature control unit 75. A flow of controls in the air temperature control unit 75 is described below.

First, in step S1, the first temperature difference computation unit 751 calculates the difference $\Delta T1$ obtained by subtracting the temperature at the inlet of the cathode in the first fuel cell stack 11 from the temperature at the outlet of the cathode therein.

In step S2, the second temperature difference computation unit 752 calculates the difference $\Delta T2$ obtained by subtracting the temperature at the inlet of the cathode in the second fuel cell stack 12 from the temperature at the outlet of the cathode therein. Steps S1 and S2 also can be performed in opposite order or can be performed simultaneously.

In step S3, the target temperature computation unit 753 assesses whether $\Delta T2<0$ and $\Delta T1+\Delta T2<0$. If the result of assessment is YES, the process advances to step S4; if the result of assessment is NO, the process advances to step S5.

In step S4, the target temperature computation unit 753 assesses that the cathode inlet (temperature of the cathode gas at the inlet) in the second fuel cell stack 12 of the fuel cell module 1 has the highest temperature, calculates the target temperature T according to T=Tmax, and outputs the target temperature T to the drive control unit 754.

In step S5, the target temperature computation unit 753 assesses whether $\Delta T1>0$. If the result of assessment is YES, the process advances to step S6; if the result of assessment is NO, the process advances to step S7.

In step S6, the target temperature computation unit 753 assesses that the cathode outlet (temperature of the cathode gas at the outlet) in the first fuel cell stack 11 of the fuel cell module 1 has the highest temperature, calculates the target temperature T according to T=Tmax−ΔT1−ΔT2, and outputs the target temperature T to the drive control unit 754.

In step S7, the target temperature computation unit 753 assesses that the cathode outlet (temperature of the cathode gas at the outlet) in the second fuel cell stack 12 of the fuel cell module 1 has the highest temperature, calculates the target temperature T according to T=Tmax−ΔT2, and outputs the target temperature T to the drive control unit 754.

The air temperature control unit 75 repeats the aforementioned steps S1 to S7 for as long as the fuel cell module 1 continues generating electric power.

As described above, the temperature sensor 51 is arranged at the cathode outlet in the first fuel cell stack 11, and the target temperature can be calculated according to the same control flow even when the temperature at the outlet of the cathode is employed as the target temperature. However, the target temperature computation unit 753 calculates the target temperature in accordance with formula 2 in that instance.

Specifically, in step S4, the target temperature computation unit 753 calculates the target temperature T according to T=Tmax+ΔT1+ΔT2. Additionally, in step S6, the target temperature computation unit 753 calculates the target temperature T according to T=Tmax. Furthermore, in step S7, the target temperature computation unit 753 calculates the target temperature T according to T=Tmax+ΔT1.

As described above, the fuel cell system according to the present embodiment is a fuel cell system including: a fuel cell module 1 that includes a first fuel cell (first fuel cell stack 11) and a second fuel cell (second fuel cell stack 12) arranged in series, a fuel gas (anode gas) circulating in a direction from the first fuel cell toward the second fuel cell, and an oxidant gas (cathode gas) circulating in a direction from the second fuel cell (second fuel cell stack 12) toward the first fuel cell (first fuel cell stack 11); and an oxidant gas temperature adjustment device (temperature adjustment device 38) for adjusting a temperature of the oxidant gas (cathode gas) supplied to the fuel cell module 1, it being possible, at a minimum, for the first fuel cell (first fuel cell stack 11) to reform the fuel gas (anode gas), wherein the fuel cell system includes a temperature control means (air temperature control unit 75) for setting a target temperature of the oxidant gas (cathode gas) supplied to the fuel cell module 1 such that a temperature of the first fuel cell (first fuel cell stack 11) and a temperature of the second fuel cell (second fuel cell stack 12) do not exceed a prescribed upper-limit temperature and controlling the oxidant gas temperature adjustment device (temperature adjustment device 38) based on the target temperature, and the temperature control means (air temperature control unit 75) calculates the target temperature T as T=Tmax−ΔT1−ΔT2 (ΔT1>0), T=Tmax−ΔT2 (ΔT1≤0), or T=Tmax (ΔT2<0 and ΔT1+ΔT2<0), where T is the target temperature, Tmax is the upper-limit temperature, ΔT1 is a difference obtained by subtracting a temperature at an inlet of the first fuel cell (first fuel cell stack 11) from a temperature at an outlet thereof, and ΔT2 is a difference obtained by subtracting a temperature at an inlet of the second fuel cell (second fuel cell stack 12) from a temperature at an outlet thereof.

According to the above configuration, it is possible, even when a position having a highest temperature in the fuel cell module 1 is the cathode outlet in the first fuel cell (first fuel cell stack 11) or the cathode outlet in the second fuel cell (second fuel cell stack 12), to identify the position having the highest temperature by calculating ΔT1 and ΔT2 and to calculate the target temperature T corresponding thereto. It is therefore possible, even in the fuel cell module 1 that includes at least the first fuel cell (first fuel cell stack 11) in which a reformation reaction is carried out, to realize a control for generating electric power in a state in which a high temperature is maintained but does not exceed an upper-limit temperature by using a simple configuration.

Additionally, according to the above configuration, it is possible, even when the position having the highest temperature in the fuel cell module 1 is the cathode inlet in the second fuel cell (second fuel cell stack 12), to identify that the position having the highest temperature is the aforementioned inlet by calculating ΔT1 and ΔT2 and to calculate the target temperature T corresponding thereto. It is therefore possible, even in the fuel cell module 1 that includes at least the first fuel cell (first fuel cell stack 11) in which the reformation reaction is carried out, to realize a control for generating electric power in a state in which a high temperature is maintained but does not exceed an upper-limit temperature by using a simple configuration.

In the present embodiment, the temperature control means (air temperature control unit 75): calculates ΔT1 based on an amount of heat generated in association with generation of electric power in the first fuel cell (first fuel cell stack 11), an amount of heat absorbed in the reformation reaction of the fuel gas (anode gas) supplied to the first fuel cell (first fuel cell stack 11), an amount of heat released to outside of the first fuel cell (first fuel cell stack 11), and a flow rate of the oxidant gas (cathode gas) supplied to the first fuel cell (first fuel cell stack 11); and calculates ΔT2 based on an amount of heat generated in association with generation of electric power in the second fuel cell (second fuel cell stack 12), an amount of heat released to outside of the second fuel cell (second fuel cell stack 12), and a flow rate of the oxidant gas (cathode gas) supplied to the second fuel cell (second fuel cell stack 12).

According to the above configuration, it is possible to calculate ΔT1 and ΔT2 without actually detecting a temperature.

In the present embodiment: the fuel cell system is provided with an oxygen supply source (blower 32) for supplying oxygen to an anode in the first fuel cell (first fuel cell stack 11); at least the first fuel cell (first fuel cell stack 11) is configured to be capable of carrying out a partial oxidation reaction using the oxygen and the fuel gas (anode gas); and the temperature control means (air temperature control unit 75) calculates ΔT1 based on an amount of heat generated in association with generation of electric power in the first fuel cell (first fuel cell stack 11), an amount of heat generated through the partial oxidation reaction, an amount of heat absorbed in a reformation reaction according to a difference obtained by subtracting a flow rate of the fuel gas (anode gas) lost due to the partial oxidation reaction from a flow rate of the fuel gas (anode gas) supplied to the first fuel cell (first fuel cell stack 11), an amount of heat released to outside of the first fuel cell (first fuel cell stack 11), and a flow rate of the oxidant gas (cathode gas) supplied to the first fuel cell (first fuel cell stack 11), and calculates ΔT2 based on an amount of heat generated in association with generation of electric power in the second fuel cell (second fuel cell stack 12), an amount of heat released to outside of the second fuel cell (second fuel cell stack 12), and a flow rate of the oxidant gas (cathode gas) supplied to the second fuel cell (second fuel cell stack 12).

According to the above configuration, it is possible, even when the partial oxidation reaction is executed in the first fuel cell (first fuel cell stack 11), to calculate ΔT1 and ΔT2 without actually detecting a temperature.

In the present embodiment: the oxidant gas temperature adjustment device (temperature adjustment device 38) is provided with a combustor 4 for mixing and starting combustion of a fuel off-gas (anode off-gas) and an oxidant off-gas (cathode off-gas) that are discharged from the fuel cell module 1, a heat exchanger 35 for carrying out heat exchange between a combustion gas discharged from the combustor 4 and the oxidant gas (cathode gas) supplied to the fuel cell module 1, and an additional fuel supply means (injector 24) for supplying additional fuel to the combustor 4; and the temperature control means (air temperature control unit 75) controls the additional fuel supply means (injector 24) such that the oxidant gas (cathode gas) reaches the target temperature.

A temperature of air taken in from the outside is equivalent to an outside air temperature. It is necessary to heat the air because the temperature of the air is low enough to hinder generation of electric power when the air is directly supplied to the fuel cell module 1 (SOFCs). However, it is also necessary to introduce fuel into the fuel cell module 1 more abundantly than is required for electric power generation, and a surplus is left over. Thus, the oxidant gas temperature adjustment device (temperature adjustment device 38) carries out heat exchange between the high-temperature combustion gas, which is obtained through combustion of the remaining fuel (anode off-gas) and high-temperature air (cathode off-gas) discharged from the fuel cell module 1 by using the combustor 4, and the air (cathode gas) supplied to the fuel cell module 1. Due to the oxidant gas temperature adjustment device (temperature adjustment device 38) supplying the air (cathode gas) heated through the heat exchange to the fuel cell module 1, a highly efficient fuel cell system is produced.

Moreover, when the temperature of the heated air (cathode gas) does not reach the target temperature, the additional fuel is supplied to the combustor 4 to raise the temperature of the fuel gas and an amount of air (cathode gas) subjected to heat exchange is increased, thereby making it possible to cause the temperature of the air (cathode gas) to reach the target temperature.

In the present embodiment: the fuel cell system includes an oxidant gas supply source (blower 32) for supplying the oxidant gas (cathode gas) to the fuel cell module 1; the oxidant gas temperature adjustment device (temperature adjustment device 38) is provided with a combustor 4 for mixing and starting combustion of a fuel off-gas (anode off-gas) and an oxidant off-gas (cathode off-gas) that are discharged from the fuel cell module 1, a heat exchanger 35 for connecting the oxidant gas supply source (blower 32) and the fuel cell module 1 and carrying out heat exchange between a combustion gas discharged from the combustor 4 and the oxidant gas (cathode gas) supplied to the fuel cell module 1, a bypass flow path 34 for supplying the oxidant gas (cathode gas) from the oxidant gas supply source (blower 32) to the fuel cell module 1 while bypassing the heat exchanger 35, a flow rate adjustment means (bypass valve 33) for adjusting a proportion of flow rates of the oxidant gas (cathode gas) in the heat exchanger 35 and the bypass flow path 34, and an additional fuel supply means (injector 24) for supplying additional fuel to the combustor 4; and the temperature control means (air temperature control unit 75) controls the flow rate adjustment means (bypass valve 33) and/or the additional fuel supply means (injector 24) such that the oxidant gas (cathode gas) reaches the target temperature.

According to the above configuration, when the temperature of the heated air (cathode gas) is greater than the target temperature, a flow rate of the air circulating through the bypass flow path 34 is increased to reduce the amount of air subjected to heat exchange with the heat exchanger 35, thereby making it possible to rapidly reduce the temperature of the air (cathode gas) to the target temperature. Conversely, when the temperature of the heated air (cathode gas) is less than the target temperature, the flow rate of the air circulating through the bypass flow path 34 is reduced to increase the amount of air subjected to heat exchange with the heat exchanger 35, thereby making it possible to rapidly raise the temperature of the air (cathode gas) to the target temperature.

The invention claimed is:

1. A fuel cell system comprising:
   a fuel cell module including a first fuel cell and a second fuel cell arranged in series such that a fuel gas circulates in a direction from the first fuel cell toward the second fuel cell and an oxidant gas circulates in a direction from the second fuel cell toward the first fuel cell, the first fuel cell being at least configured to reform the fuel gas;
   an oxidant gas temperature adjustment device configured to adjust a temperature of the oxidant gas supplied to the fuel cell module; and
   a temperature control unit configured to set a target temperature of the oxidant gas supplied to the fuel cell module such that a temperature of the first fuel cell and a temperature of the second fuel cell do not exceed a prescribed upper-limit temperature, and configured to control the oxidant gas temperature adjustment device based on the target temperature, and
   the temperature control unit being configured to calculate the target temperature T as follows $T = T\max - \Delta T1 - \Delta T2 (\Delta T1 > 0),$ $T = T\max - \Delta T2 (\Delta T1 \leq 0),$ or $T = T\max (\Delta T2 < 0 \text{ and } \Delta T1 + \Delta T2 < 0),$ where T is the target temperature, Tmax is an upper-limit temperature, ΔT1 is a difference obtained by subtracting a temperature at an inlet of the first fuel cell from a temperature at an outlet thereof, and ΔT2 is a difference obtained by subtracting a temperature at an inlet of the second fuel cell from a temperature at an outlet thereof.

2. The fuel cell system according to claim 1, wherein the temperature control unit is configured to
   calculate ΔT1 based on an amount of heat generated in association with generation of electric power in the first fuel cell, an amount of heat absorbed in the reformation reaction of the fuel gas supplied to the first fuel cell, an amount of heat released to outside of the first fuel cell, and a flow rate of the oxidant gas supplied to the first fuel cell; and
   calculate ΔT2 based on an amount of heat generated in association with generation of electric power in the second fuel cell, an amount of heat released to outside of the second fuel cell, and a flow rate of the oxidant gas supplied to the second fuel cell.

3. The fuel cell system according to claim 1, further comprising an oxygen supply source configured to supply oxygen to an anode in the first fuel cell, the first fuel cell is at least configured to be capable of carrying out a partial oxidation reaction using the oxygen and the fuel gas; and the temperature control unit being configured to calculate ΔT1 based on an amount of heat generated in association with generation of electric power in the first fuel cell, an amount of heat generated through the partial oxidation reaction, an amount of heat absorbed in a reformation reaction according to a difference obtained by subtracting a flow rate of the fuel gas lost due to the partial oxidation reaction from a flow rate of the fuel gas supplied to the first fuel cell, an amount of heat released to outside of the first fuel cell, and a flow rate of the oxidant gas supplied to the first fuel cell, and calculate ΔT2 based on an amount of heat generated in association with generation of electric power in the second fuel cell, an amount of heat released to outside of the second fuel cell, and a flow rate of the oxidant gas supplied to the second fuel cell.

4. The fuel cell system according to claim 1, wherein the oxidant gas temperature adjustment device includes a combustor configured to mix and start combustion of a fuel off-gas and an oxidant off-gas that are discharged from the fuel cell module, a heat exchanger configured to carry out heat exchange between a combustion gas discharged from the combustor and the oxidant gas supplied to the fuel cell module, and an additional fuel supply source configured to supply additional fuel to the combustor; and the temperature control unit is configured to control the additional fuel supply means such that the oxidant gas reaches the target temperature.

5. The fuel cell system according to claim 1, further comprising an oxidant gas supply source configured to supply the oxidant gas to the fuel cell module, the oxidant gas temperature adjustment device including a combustor configured to mix and start combustion of a fuel off-gas and an oxidant off-gas that are discharged from the fuel cell module, a heat exchanger configured to connecting the oxidant gas supply source and the fuel cell module and configured to carry out heat exchange between a combustion gas discharged from the combustor and the oxidant gas supplied to the fuel cell module, a bypass flow path configured to supply the oxidant gas from the oxidant gas supply source to the fuel cell module while bypassing the heat exchanger, a bypass valve configured to adjust a proportion of flow rates of the oxidant gas in the heat exchanger and the bypass flow path, and an additional fuel supply source configured to supply additional fuel to the combustor; and the temperature control unit being configured to control at least one of the bypass valve and the additional fuel supply source such that the oxidant gas reaches the target temperature.

* * * * *